(12) United States Patent
Stigall

(10) Patent No.: US 7,046,147 B2
(45) Date of Patent: May 16, 2006

(54) INTEGRATED SECURITY SYSTEM AND METHOD

(75) Inventor: Robert E. Stigall, Plano, TX (US)

(73) Assignee: RF Monolithics, Inc., Dallas, TX (US)

( * ) Notice: Subject to any disclaimer, the term of this patent is extended or adjusted under 35 U.S.C. 154(b) by 241 days.

(21) Appl. No.: 10/651,386

(22) Filed: Aug. 29, 2003

(65) Prior Publication Data

US 2005/0046571 A1 Mar. 3, 2005

(51) Int. Cl.
G08B 13/14 (2006.01)

(52) U.S. Cl. .................................. 340/572.1; 340/539
(58) Field of Classification Search ............. 340/572.1, 340/573.1, 10.1, 572.8, 539, 426.11; 235/462.43, 235/462.44, 462.45
See application file for complete search history.

(56) References Cited

U.S. PATENT DOCUMENTS

| | | | |
|---|---|---|---|
| 4,898,120 A | 2/1990 | Brose | |
| 5,241,923 A | 9/1993 | Janning | |
| 5,349,329 A | 9/1994 | Smith | |
| 5,787,841 A | 8/1998 | Titus et al. | |
| 6,067,018 A | 5/2000 | Skelton et al. | |
| 6,112,152 A | 8/2000 | Tuttle | |
| 6,427,913 B1 | 8/2002 | Maloney | |
| 6,429,768 B1* | 8/2002 | Flick | 340/5.2 |
| 6,486,780 B1* | 11/2002 | Garber et al. | 340/572.1 |
| 6,488,099 B1 | 12/2002 | McSheffrey et al. | |
| 6,577,238 B1* | 6/2003 | Whitesmith et al. | 340/572.1 |
| 6,700,533 B1* | 3/2004 | Werb et al. | 342/357.07 |
| 6,888,459 B1* | 5/2005 | Stilp | 340/541 |
| 6,898,489 B1* | 5/2005 | Hayes, Sr. | 701/1 |
| 2002/0101351 A1 | 8/2002 | Lochner | |
| 2002/0113705 A1 | 8/2002 | Wallace | |
| 2002/0175825 A1 | 11/2002 | Clerk et al. | |
| 2003/0005316 A1 | 1/2003 | Girard | |

OTHER PUBLICATIONS

Bluesoft, Inc.; "Increasing the Utility and Security of Network Assets"; pp. 52-58.

* cited by examiner

Primary Examiner—John Tweel, Jr.

(57) ABSTRACT

An asset subsystem is provided for use in a security system. The security system includes a security system controller operable to trigger an alarm. The asset subsystem includes a transceiver operable to communicate a first signal to a tag associated with an asset and to receive a second signal communicated by the tag in response to the first signal. The asset subsystem also includes a controller operable to determine whether the tag failed to communicate the second signal to the transceiver and trigger the alarm in response to determining that the tag failed to communicate the second signal to the transceiver.

33 Claims, 5 Drawing Sheets

INTEGRATED SECURITY SYSTEM AND METHOD

TECHNICAL FIELD

This disclosure relates generally to security systems and more specifically to an integrated security system and method.

BACKGROUND

Security systems are becoming more and more popular in the United States and around the world. For example, a conventional home security system monitors doors and windows of a residence when activated. If a door or window opens or a window is broken, the security system sounds an alarm and contacts a security company or the police. A problem with conventional security systems is that they are often unable to monitor valuable assets within or near the monitored residence. As a result, these assets are often vulnerable to theft when the security system is not activated or fails to detect an intruder.

SUMMARY

This disclosure provides an integrated security system and method.

In one aspect, an asset subsystem is provided for use in a security system. The security system includes a security system controller operable to trigger an alarm. The asset subsystem includes a transceiver operable to communicate a first signal to a tag associated with an asset and to receive a second signal communicated by the tag in response to the first signal. The asset subsystem also includes a controller operable to determine whether the tag failed to communicate the second signal to the transceiver and trigger the alarm in response to determining that the tag failed to communicate the second signal to the transceiver.

In another aspect, a tag includes a transceiver operable to receive a first signal and to communicate a second signal. The tag also includes a controller operable to detect the first signal received by the transceiver and initiate communication of the second signal by the transceiver. The controller is also operable to trigger an external circuit in response to determining that the first signal was not received within a specified period of time.

One or more technical features may be present according to various embodiments of this disclosure. Particular embodiments of this disclosure may exhibit none, some, or all of the following features depending on the implementation. For example, in one embodiment, an integrated security system is provided. In particular, the security system includes a control unit that communicates with one or more tags connected to various assets. The assets could include electronics, firearms, or automobiles. The control unit polls the tags and waits for responses from the tags. When the control unit fails to receive a response from one or more of the tags, the control unit may take suitable action, such as causing the security system to sound an alarm or contact the police. The tag connected to an asset could also take suitable action when it fails to detect the poll from the control unit, such as activating an alarm in an automobile to which the tag is attached. In this way, the various assets can be monitored and protected by the security system.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
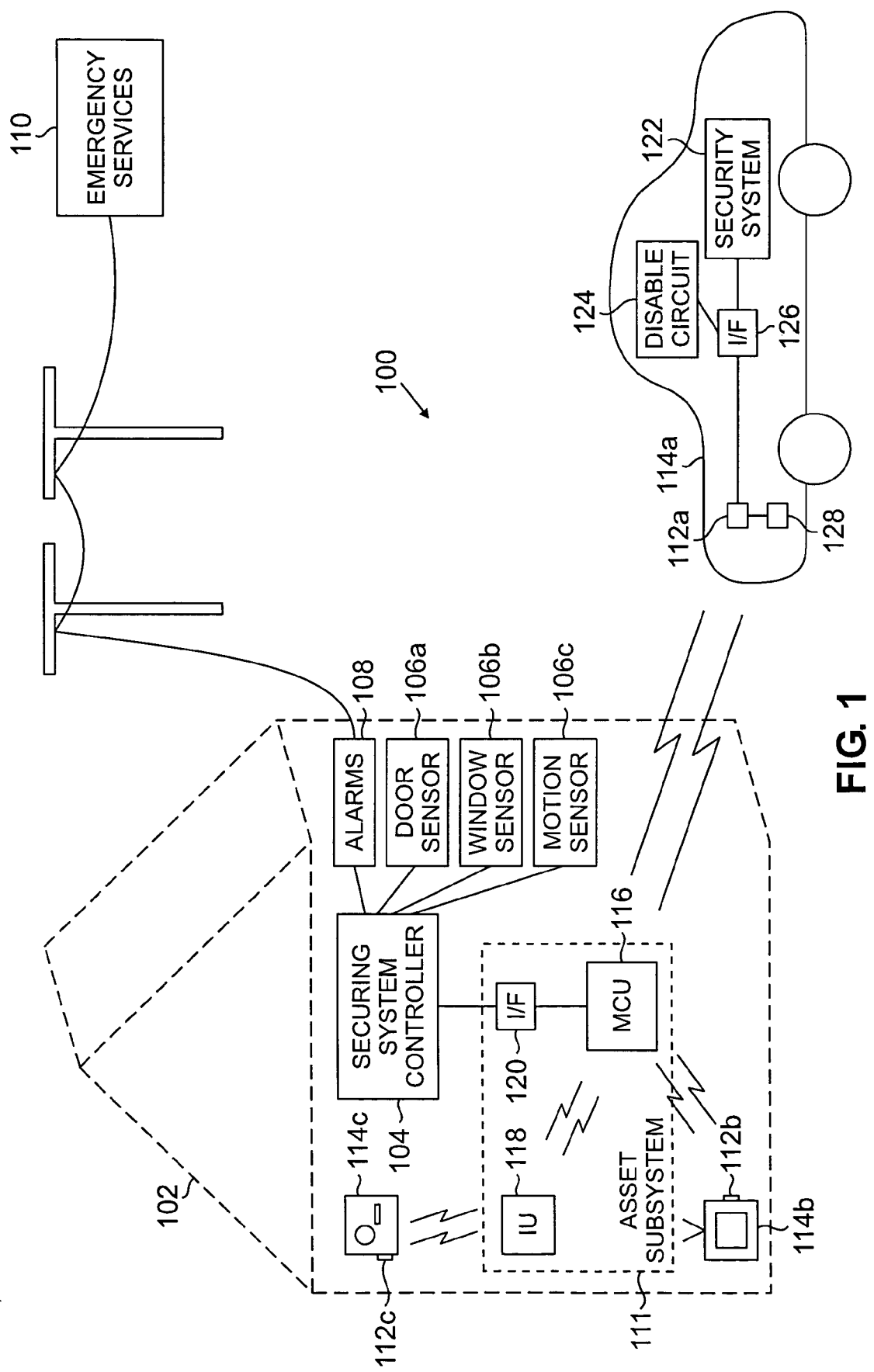
FIG. 1 illustrates an example security system according to one embodiment of this disclosure.

FIG. 1 illustrates an example security system 100 according to one embodiment of this disclosure. In this example embodiment, the security system 100 represents a home security system for a residence. The security system 100 shown in FIG. 1 could also be used in any other suitable location, including a business, a storage area, or a government building.

In this example, a house 102 has a security system that includes a security system controller 104, one or more sensors 106a–106c, and one or more alarms 108. The security system controller 104 may monitor the sensors 106 and trigger one or more alarms 108 when the sensors 106 detect various events. For example, the door sensor 106a may detect when a door to the house 102 is opened. The window sensor 106b may detect when a window in the house 102 is opened or broken. The motion sensor 106c may detect movement outside or inside the house 102. The alarms 108 could include an audible alarm, strobe lights or other lights, or a telephone auto-dialer that can place a telephone call to the police, a security company, or other emergency services 110.

The controller 104 may represent any suitable controller for monitoring one or more sensors 106 and activating one or more alarms 108. Each sensor 106 may represent any device or structure for detecting one or more events. Each alarm 108 may represent any device or structure capable of performing an action in response to the controller 104.

In the illustrated example, the security system 100 also includes an asset subsystem 111 that monitors one or more tags 112a–112c attached to one or more assets 114a–114c. Each of the tags 112 may include a transceiver that receives a polling signal and that transmits a response to the polling signal. For example, each tag 112 could include a radio frequency (RF) transceiver capable of transmitting and receiving radio frequency signals. Each tag 112 could be powered by any suitable power supply, such as a battery, another direct current (DC) power supply, or an alternating current (AC) power supply. Each of the assets 114 could represent any suitable tangible object, such as an automobile 114a, a television 114b, or a safe 114c.

In this example, the asset subsystem 111 includes a master control unit (MCU) 116 that facilitates the polling and tracking of the tags 112 attached to the assets 114. For example, the MCU 116 could generate and communicate the polling signals to the tags 112 and receive the responses from the tags 112. The MCU 116 could also identify when one or more tags 112 fail to respond to the polling signals and inform the controller 104. The controller 104 could then take suitable action, such as triggering one or more alarms 108. The MCU 116 could represent any hardware, software, firmware, or combination thereof for polling tags 112 and processing responses from the tags 112. Also, the MCU 116 could represent a fixed unit in the house 102 or a portable unit, such as a unit capable of being clipped to the belt of a user. Further, the MCU 116 could be armed and operate to detect missing tags 112 in conjunction with or independent of the arming of the controller 104.

In some environments, the MCU 116 may be unable to communicate with some or all of the tags 112. This may occur, for example, where radio frequency communications are difficult or unreliable. Also, the MCU 116 and the tags 112 may need to be physically distributed. In these or other situations, the asset subsystem 111 includes one or more intermediate units (IU) 118. The intermediate unit 118 may communicate with and act as a relay between the MCU 116 and the tags 112. For example, when instructed by the MCU 116, the intermediate unit 118 could generate and communicate polling signals to the tags 112. The intermediate unit 118 could also receive responses from the tags 112 and forward the responses to the MCU 116 for processing. In addition, various functions described above as being performed by the MCU 116 could also be performed by the intermediate unit 118. As an example, the intermediate unit 118 could process the responses from the tags 112, identify any tags 112 that fail to respond, and trigger an alarm 108. The intermediate unit 118 could include any hardware, software, firmware, or combination thereof for polling tags 112 and receiving responses from the tags 112. The intermediate unit 118 could communicate with the control unit 116 using any suitable technique, such as over a wireless or wireline connection.

In some embodiments, the MCU 116 may be unable to communicate directly with the security system controller 104. This may occur, for example, when the MCU 116 is being added to an existing security system and the controller 104 lacks the functionality to communicate with the MCU 116. To facilitate communication between the MCU 116 and the controller 104, the asset subsystem 111 includes an interface unit (I/F) 120. The interface unit 120 allows the MCU 116 to inform the controller 104 when the MCU 116 fails to receive a response from a tag 112 attached to an asset 114. The interface unit 120 may include any hardware, software, firmware, or combination thereof for facilitating communication between the MCU 116 and the controller 104. In some embodiments, the MCU 116 is portable, and the interface unit 120 represents a power cradle capable of receiving the MCU 116.

Although the interface unit 120 is illustrated as being a separate component in the system 100, the interface unit 120 could be combined with another component, such as the MCU 116 or the controller 104. Also, in some embodiments, the interface unit 120 or the MCU 116 could be configured to appear as a sensor 106 to the security system controller 104. As a particular example, the controller 104 may represent part of a pre-installed security system. Configuring the interface unit 120 or the MCU 116 to appear as a sensor 106 could allow the tag-tracking functionality to be provided in the system 100 without the need to replace the controller 104.

This description has described the MCU 116 as informing the controller 104 when a tag 112 fails to respond to a poll and the controller 104 triggering the alarms 108. In other embodiments, the MCU 116 could trigger the alarms 108 directly without going through the controller 104. In these embodiments, an interface unit, such as the interface unit 120, could be used to facilitate communication between the MCU 116 and the alarms 108. In still other embodiments, the MCU 116 need not trigger any external alarms 108 or communicate with the security system controller 104. In these embodiments, the MCU 116 could include one or more internal alarms that can be triggered when a tag 112 fails to respond to a polling signal.

In some embodiments, the tags 112 could also have the ability to trigger one or more alarms. For example, a tag 112 could include lights or an audible alarm that is activated when the tag 112 fails to receive a polling message for a specified amount of time. As a particular example, the tag 112a in an automobile 114a could be configured to activate a security system 122 installed in the automobile 114a. The tag 112a could also be configured to trigger a disable circuit 124 in the automobile 114a, which could shut down or prevent the automobile's engine from running, cause the engine to shift into neutral, or otherwise disable the automobile 114a. An interface unit 126 could also be provided in the automobile 114a to facilitate communication between the tag 112a, the security system 122, and the disable circuit 124. Although the interface unit 126 is illustrated as being a separate component in the system 100, the interface unit 126 could be combined with another component, such as the tag 112a, the security system 122, or the disable circuit 124.

In this example, the owner of the automobile 114a may park the automobile 114a outside of the house 102. When the security system 100 is activated, the MCU 116 or intermediate unit 118 begins polling the tag 112a. The tag 112a responds when it receives the polling signals. If someone attempts the steal the automobile 114a and begins driving the automobile 114a away from the house 102, the tag 112a eventually stops receiving the polling signals from the MCU 116 or intermediate unit 118. At this point, the tag 112a can trigger the security system 122 and the disable circuit 124. In this way, the automobile 114a may only travel a short distance from the house 102 before it is disabled, allowing the owner to recover the automobile 114a quickly.

A tag 112 could also include or have access to one or more sensors 128, such as a motion sensor. The motion sensor could detect when an asset 114 is being moved, and the tag 112 could inform the MCU 116 that the asset 114 is moving. The MCU 116 could then determine whether the asset 114 in question is allowed to be moved. If not, the MCU 116 or the tag 112 could initiate one or more alarms. In this way, the asset 114 can be protected even when the tag 112 attached to the asset 114 is still receiving polling signals. Other types of sensors, such as pressure sensors, could also be accessible to the tag 112. A sensor could also be coupled to the intermediate unit 118.

The MCU 116 could determine whether an asset 114 is allowed to be moved in any suitable manner. For example, each tag 112 could transmit an identifier uniquely identifying the tag 112, and the MCU 116 could determine whether a particular tag 112 is attached to an asset 114 that can be moved. Different types of tags 112 could also be used for assets 114 that can be moved and for assets that cannot be moved, such as when the two types of tags transmit different identifiers or responses to the MCU 116. The MCU 116 could then determine whether the tag 112 being moved represents a tag associated with a movable asset 114.

Although the tags 112 have been described as including the ability to trigger one or more alarms, the tags 112 need not include this functionality. For example, the tag 112a may not be able to trigger the security system 122 or the disable circuit 124 in the automobile 114a.

The communication between the MCU 116 or the intermediate unit 118 and the tags 112 can operate using various parameters. For example, the polling signals could be transmitted to the tags 112 at any suitable time interval. Also, the MCU 116 could allow a tag 112 to miss a specified number of polling signals before activating an alarm 108. In this way, a tag 112 that fails to respond to one or more polling signals due to temporary interference or other problems may be able to respond to the next polling signal and avoid triggering an alarm 108. Further, the response communicated by a tag 112 could represent any suitable response, such as dynamic or pre-programmed responses. Multiple responses could be pre-programmed into the tag 112, such as one response that is sent when a motion sensor detects movement by the asset 114 and another response that is sent when no movement is detected.

In addition, the range between the MCU 116 or the intermediate unit 118 and the tags 112 can be limited to a specified range. The range may be controlled, for example, by setting the transmission power of the MCU 116, intermediate unit 118, or tags 112 to a specified power level. Moreover, different transmitters could be used to communicate different polling signals to the tags 112. For example, one transmitter could have a shorter operational range, and another transmitter could have a longer operational range. As a particular example, the transmitter with the shorter range could be used for tags 112 inside the house 102, while the transmitter with the longer range communicates polling signals to the tags 112 outside the house 102. In this way, an alarm 108 could be triggered when assets 114 within the house 102 move shorter distances.

To protect the MCU 116, intermediate unit 118, or tags 112 from tampering, these components could be programmed to take suitable actions when tampering is detected. For example, tampering with the MCU 116 could cause the MCU 116 to activate an alarm 108 or inform the controller 104 of the tampering. The MCU 116 could also deactivate its power supply, antenna, or internal circuitry. If someone tampers with a tag 112 or removes the tag 112 from an asset 114, the tag 112 can deactivate its power supply, antenna, or internal circuitry. When the system 100 attempts to poll the deactivated tag 112, the system 100 detects the absence of a response from the tag 112 and triggers an alarm 108.

Although FIG. 1 illustrates one example of a security system 100, various changes may be made to FIG. 1. For example, any number of MCUs 116, intermediate units 118, and tags 112 could be used in the system. Also, the tag 112a has been illustrated as being attached to an automobile 114a. The tag 112a could also be attached to a boat, motorcycle, truck, or any other tangible asset located outside the house 102.

Figure 2:
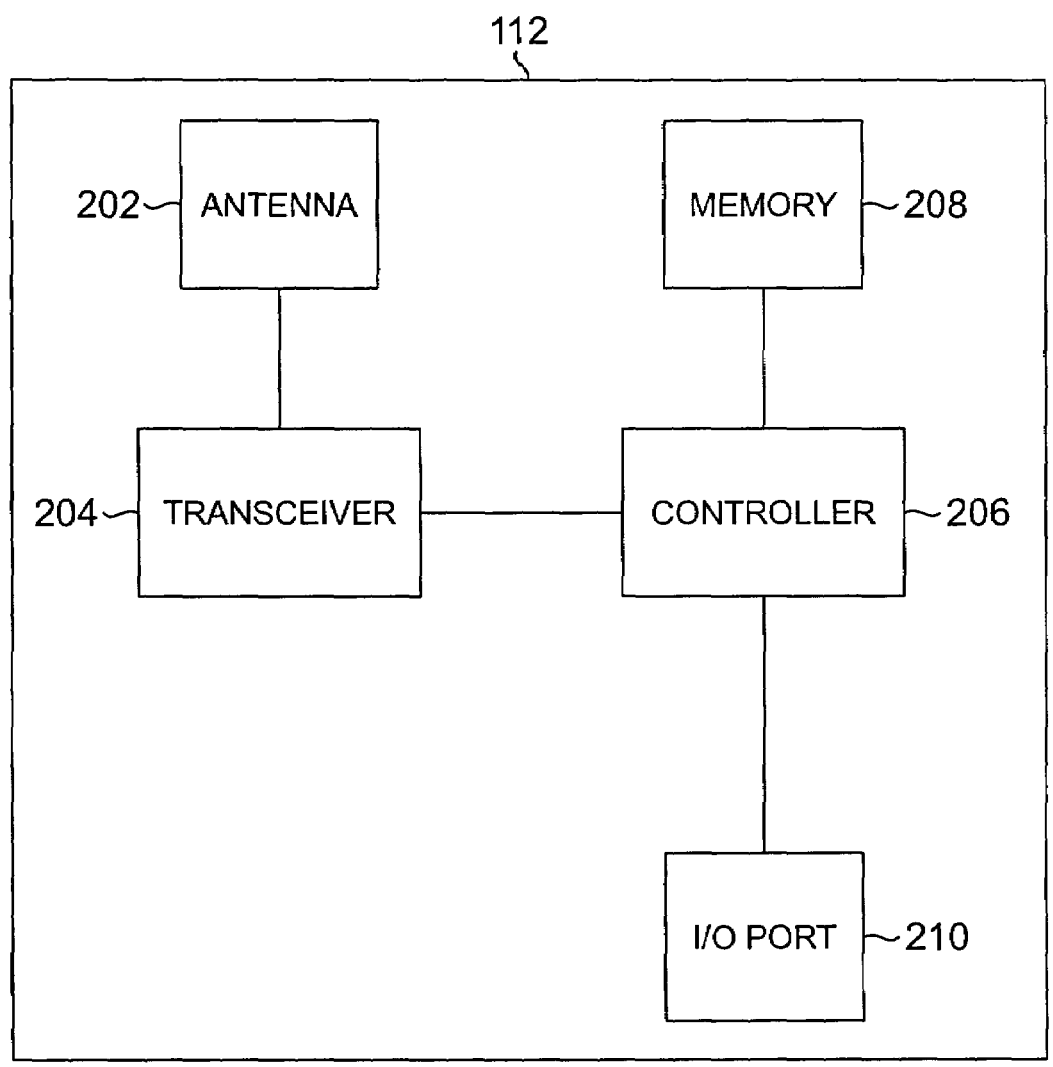
FIG. 2 illustrates an example asset tag for a security system according to one embodiment of this disclosure.

FIG. 2 illustrates an example asset tag 112 for a security system according to one embodiment of this disclosure. The tag 112 illustrated in FIG. 2 is for illustration only. Other embodiments of the tag 112 could be used in the security system 100 of FIG. 1 or in another security system without departing from the scope of this disclosure.

In the illustrated example, the tag 112 includes an antenna 202. The antenna 202 receives polling signals from the security system 100 and transmits responses to the polling signals. The antenna 202 may represent any suitable structure that can transmit and receive wireless signals, such as a radio frequency antenna.

A transceiver 204 is coupled to the antenna 202. In this specification, the term "couple" refers to any direct or indirect communication between two or more components, whether or not those components are in physical contact with one another. The transceiver 204 processes the polling signals and other signals received by the antenna 202 so that they can be processed by the tag 112. For example, the transceiver 204 could down-convert the radio frequency signals received by the antenna 202 into baseband signals. The transceiver 204 could also extract any information contained in the baseband signals and forward the extracted information to a controller 210 for processing. The transceiver 204 further processes the responses and other signals to be transmitted by the antenna 202. For example, the transceiver 204 could encode information from the controller 210 into baseband signals and up-convert baseband signals into radio frequency signals capable of being transmitted by the antenna 202. The transceiver 204 could include any structure or device that can transmit and receive wireless signals. The transceiver 204 could also represent multiple devices, such as a transmitter and a separate receiver.

The controller 210 is coupled to the transceiver 204. The controller 210 controls the operation of the tag 112. For example, the transceiver 204 could supply the controller 210 with information extracted from an incoming signal, and the controller 210 could determine whether the information represents a polling signal. If a polling signal is detected, the controller 210 could communicate a response to the transceiver 204, which prepares the response for transmission by the tag 112. The controller 210 could represent any suitable controller, such as a processor.

A memory 212 is coupled to the controller 210. The memory 212 could store any suitable information for use by the controller 210. For example, the memory 212 could store programs executed by the controller 210. As another example, in some embodiments, the responses transmitted by the tag 112 could be pre-defined responses that are stored in the memory 212. The memory 212 could further store any other or additional information, such as an identifier associated with the tag 112. The memory 212 could represent any suitable volatile or non-volatile storage and retrieval device or devices.

In some embodiments, the controller 210 can trigger one or more external alarms when the controller 210 fails to detect a polling signal for a specified amount of time. For example, the tag 112 could trigger the security system 122 or the disable circuit 124 in an automobile 114a. Also, the controller 210 could receive input from one or more sensors, such as a motion sensor or a pressure sensor. To facilitate the receipt of input from the sensors and the triggering of external alarms, the tag 112 may include an input/output (I/O) port 214. The I/O port 214 allows the controller 210 to receive input information from one or more external sources and to communicate output information to one or more external destinations. The I/O port 214 could represent any suitable structure that can facilitate communication with an external source or destination.

While FIG. 2 has been described as illustrating an example tag 112, the same or similar structure could also be used in the MCU 116 of FIG. 1. In this example, the controller 210 could control the transmission of the polling signals to the tags 112 and process the responses from the tags 112. The memory 212 could store information identifying the tags 112 that should respond to the polling signals, and the controller 210 could use this information to identify any tags 112 that failed to respond. In addition, the controller 210 could communicate with the security system controller 104 or the alarms 108 through the I/O port 214. This represents one possible embodiment of the MCU 116. Other embodiments of the MCU 116 could also be used.

Although FIG. 2 illustrates one example of an asset tag 112 for a security system, various changes may be made to FIG. 2. For example, the I/O port 214 could be omitted in the tag 112. Also, various components in the tag 112 could be combined or omitted or additional components can be added according to particular needs.

Figure 3:
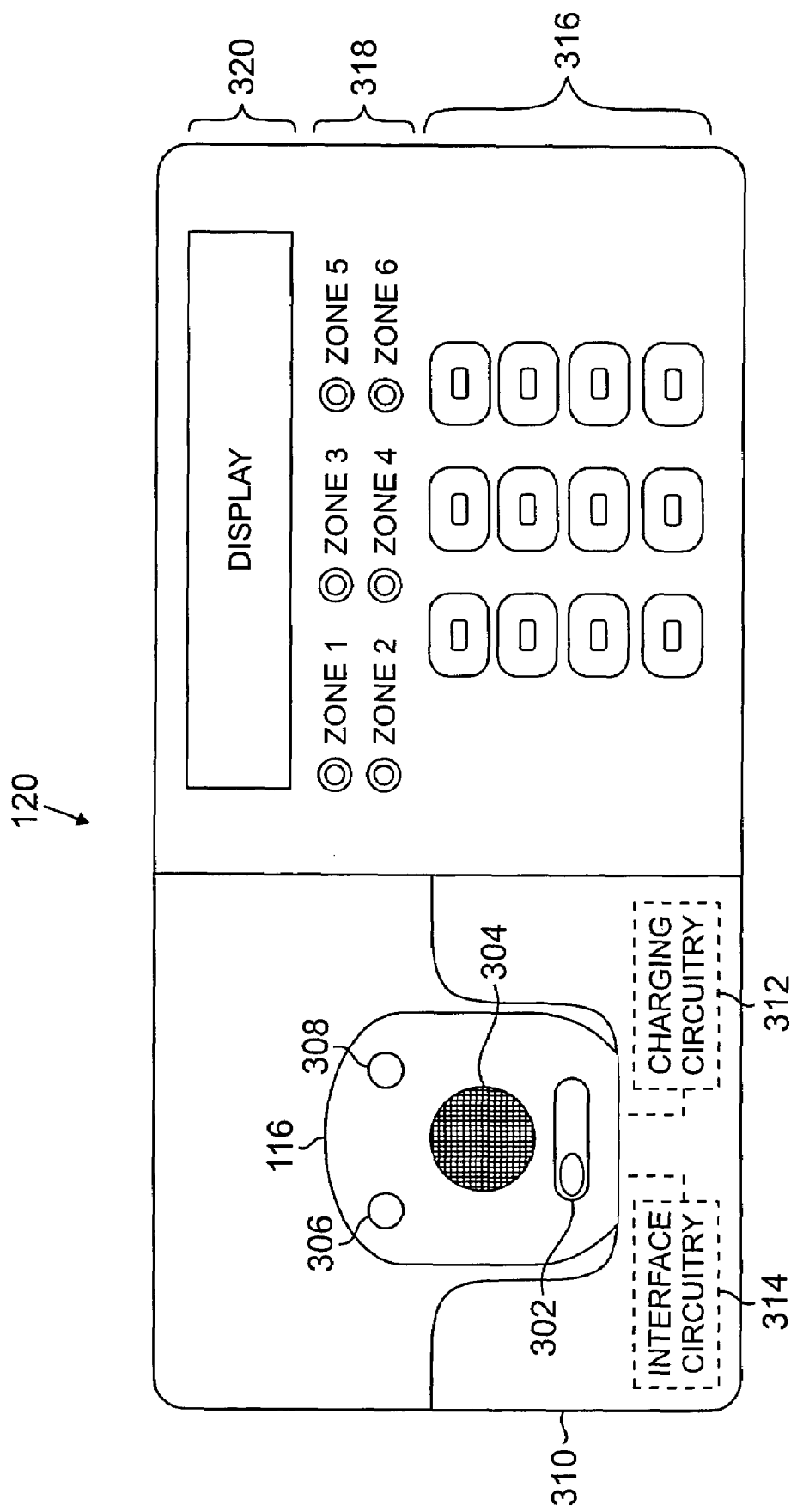
FIG. 3 illustrates an example interface unit for an example control unit in a security system according to one embodiment of this disclosure.

FIG. 3 illustrates an example interface unit 120 for an example control unit 116 in a security system according to one embodiment of this disclosure. The control unit 116 and interface unit 120 illustrated in FIG. 3 are for illustration only. Other embodiments of the control unit 116 or interface unit 120 could be used in the security system 100 of FIG. 1 or in another security system without departing from the scope of this disclosure.

In the illustrated example, the MCU 116 represents a portable unit than includes an on/off switch 302. The MCU 116 also includes a speaker 304. The speaker 304 can be used to produce audible sounds when the MCU 116 fails to receive a response from a tag 112. The MCU 116 further includes a power indicator 306, which allows a user to identify whether the MCU 116 is currently activated. In addition, the MCU 116 includes an alarm/reset indicator 308, which allows a user to identify whether the MCU 116 has activated an alarm, such as an alarm 108. In addition, as described above, the MCU 116 could have the same or similar internal components described above with respect to FIG. 2, although other embodiments could also be used.

In this example, the interface unit 120 includes a power cradle 310. The power cradle 310 operates to receive the MCU 116, such as by allowing a user to place the MCU 116 in the cradle 310. The cradle 310 could include charging circuitry 312 to supply power to the MCU 116. This may allow, for example, the MCU 116 to operate while in the cradle 310 and to charge an internal power supply. The cradle 310 could also include interface circuitry 314, which allows the MCU 116 to communicate with the security system controller 104. As a result, the MCU 116 can detect when a tag 112 fails to respond to a polling signal, and the interface circuitry 314 allows the MCU 116 to inform the controller 104 of the missing tag 112. The charging circuitry 312 and the interface circuitry 314 could represent any suitable logic, device, or structure capable of supplying power to and providing an interface for the MCU 116.

In the illustrated example, the interface unit 120 also includes a keypad 316, a zone display 318, and a display screen 320. The keypad 316 allows a user to provide codes to the security system controller 104. As particular examples, the keypad 316 could allow a user to enter a code arming the security system 100 or a code deactivating the security system 100. The keypad 316 could also include dedicated keys allowing the user to request police, fire, or medical emergency support.

The zone display 318 identifies various zones of the security system 100. For example, each zone could include different windows and doors of the house 102 in which the security system 100 operates. For each zone, the zone display 318 includes an indicator light that identifies whether the zone is secure. As an example, an indicator light could be green when the doors and windows in an associated zone are all closed. The indicator light could turn red when a door or window in the associated zone is opened.

The display 320 presents information to a user. For example, the display 320 could identify the asset 114 whose tag 112 can no longer be detected. The display 320 could present any other or additional information to the user.

Although FIG. 3 illustrates one example of an interface unit 120 and one example of an MCU 116, various changes may be made to FIG. 3. For example, the MCU 116 need not represent a portable unit. Also, other MCUs 116 or interface units 120 could be used in the security system 100. Further, the MCU 116 could communicate with the interface unit 120 using a wireless connection. In this example, the interface circuitry 314 may or may not be used in the interface unit 120.

Figure 4:
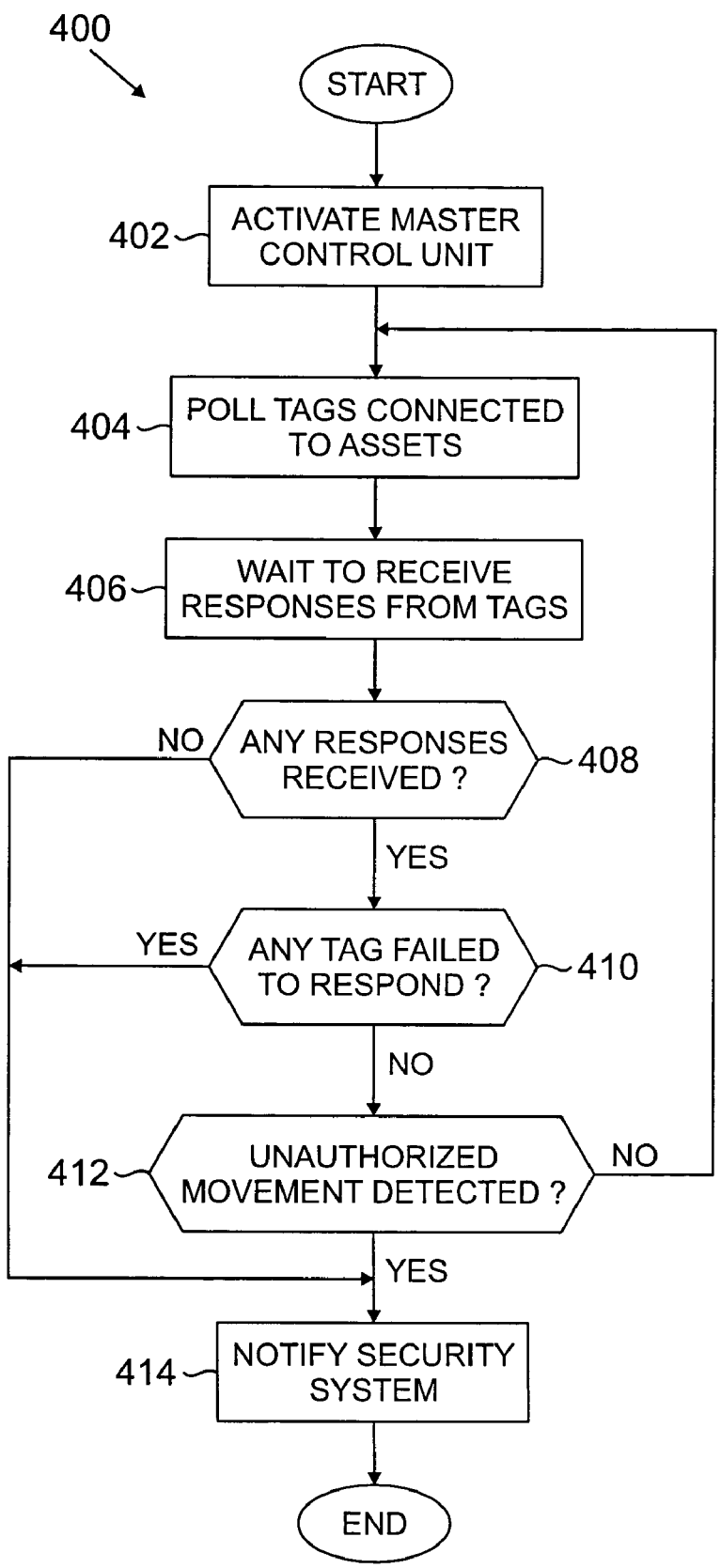
FIG. 4 illustrates an example method for monitoring assets at a control unit in a security system according to one embodiment of this disclosure.

FIG. 4 illustrates an example method 400 for monitoring assets at a control unit 116 in a security system according to one embodiment of this disclosure. The method 400 may be described with respect to the MCU 116 operating in the security system 100 of FIG. 1. The method 400 could be used by any other suitable control unit in any other suitable system.

The MCU 116 is activated at step 402. This may include, for example, a user turning on the MCU 116 using the on/off switch 302. The MCU 116 polls one or more tags 112 connected to one or more assets 114 at step 404. This may include, for example, the MCU 116 generating and communicating a polling signal to the tags 112. This could also include the MCU 116 instructing an intermediate unit 118 to generate and communicate the polling signal. The MCU 116 waits to receive responses from the polled tags 112 at step 406. This may include, for example, the MCU 116 receiving zero or more responses from the tags 112 in a specified period of time.

The MCU 116 determines whether any responses are received from the polled tags 112 at step 408. If no responses are received, the MCU 116 notifies the security system of the non-responding tags 112 at step 414. This may include, for example, the MCU 116 signaling the security system controller 104 of the missing tags 112 through an interface unit 120. The security system controller 104 could then take any suitable action, such as triggering one or more alarms 108.

If at least one response was received, the MCU 116 determines whether any tags 112 failed to respond to the polling at step 410. This may include, for example, the MCU 116 processing the responses received from the tags 112 and generating a list of the tags 112 that responded. This may also include the MCU 116 comparing the list of tags 112 that responded to a list of tags 112 that should have responded. This may further include the MCU 116 determining that at least one tag 112 that should have responded did not. The MCU 116 could receive the responses from the tags 112 directly or through one or more intermediate units 118. If at least one tag 112 failed to respond, the MCU 116 notifies the security system of the non-responding tag 112 at step 414.

If all of the tags 112 responded to the polling signal, the MCU 116 determines whether any of the assets 114 attached to the tags 112 have been moved in an unauthorized way at step 412. This may include, for example, the MCU 116 identifying any responses indicating that a motion sensor or other sensor coupled to a responding tag 112 identified movement of an asset 114. This may also include the MCU 116 identifying whether the asset 114 is authorized to be moved. If unauthorized movement is detected, the MCU 116 notifies the security system of the non-responding tag 112 at step 414. If no unauthorized movement is detected, the MCU 116 returns to step 404 to poll the tags 112 again.

Although FIG. 4 illustrates one example of a method 400 for monitoring assets at an MCU 116 in a security system, various changes may be made to FIG. 4. For example, the MCU 116 could allow a tag 112 to miss more than one polling signal before notifying the security system controller 104. Also, the MCU 116 could detect unauthorized movement at the same time it is determining whether any tags 112 failed to respond. In addition, the MCU 116 could take other action in place of notifying the security system controller 104. As particular examples, the MCU 116 could sound an alarm using its speaker 304 or trigger an alarm 108 directly.

Figure 5:
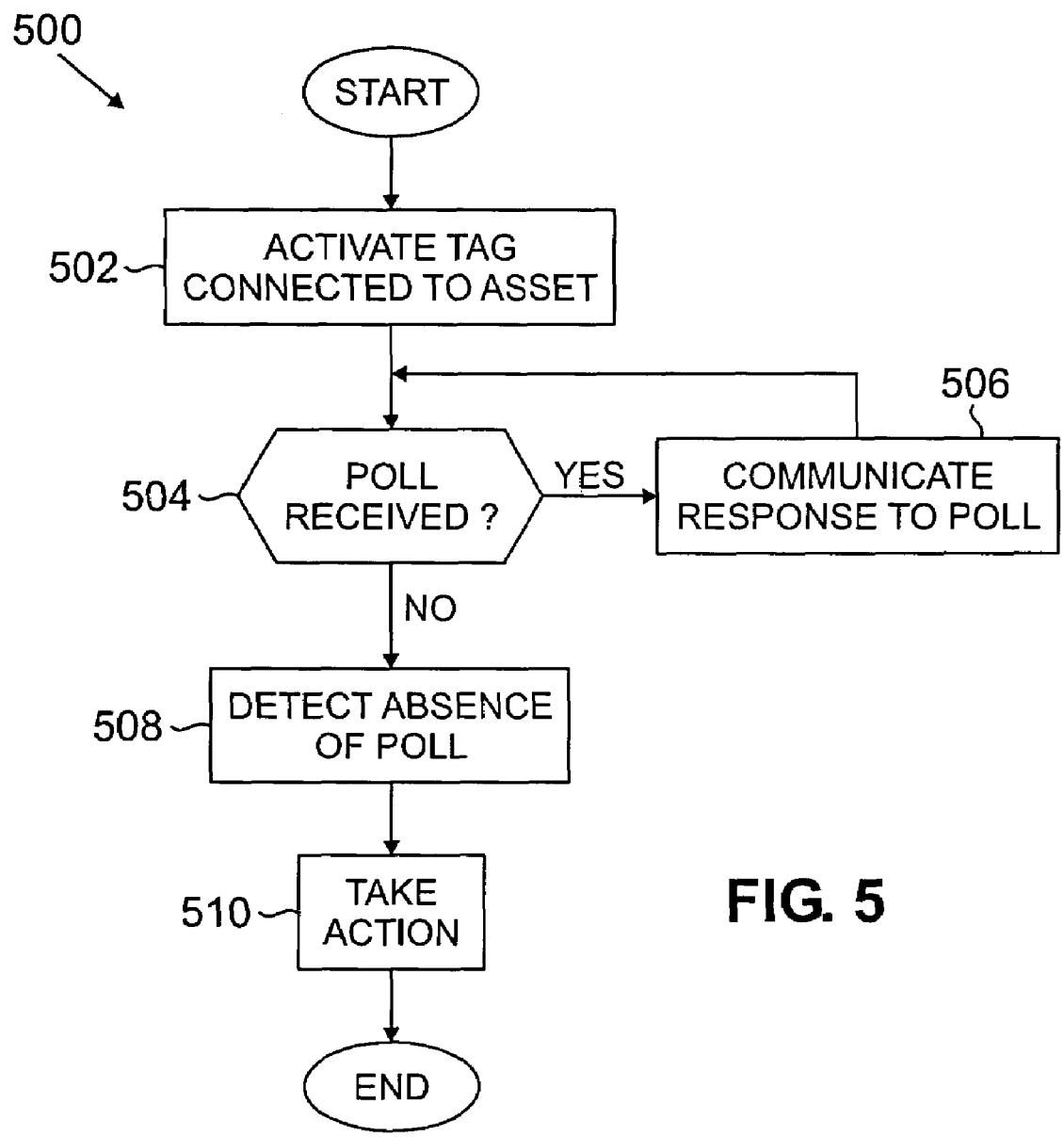
FIG. 5 illustrates an example method for monitoring assets at an asset tag in a security system according to one embodiment of this disclosure.

FIG. 5 illustrates an example method 500 for monitoring assets at an asset tag 112 in a security system according to one embodiment of this disclosure. The method 500 may be described with respect to the tag 112 operating in the security system 100 of FIG. 1. The method 500 could be used by any other suitable tag in any other suitable system.

The tag 112 is activated at step 502. This may include, for example, a user attaching the tag 112 to an asset 114 and supplying power to the tag 112. The tag 112 determines whether it receives a poll at step 504. This may include, for example, the tag 112 determining whether a radio frequency polling signal has been received from an MCU 116 or intermediate unit 118. If the tag 112 receives the poll, the tag 112 responds by communicating a response message at step 506. This may include, for example, the tag 112 generate a response that indicates whether the asset 114 attached to the tag 112 has been or is being moved. The tag 112 then returns to step 504 to await another poll from the MCU 116 or intermediate unit 118.

If the poll was not received at step 504, the tag 121 detects the absence of the poll at step 508. This may include, for example, the tag 112 determining that a specified period of time has elapsed. The tag 112 may then take any suitable action at step 510. For example, the tag 112 could trigger a security system 122 or disable circuit 124 in an automobile 114a. The tag 112 could also trigger any other external alarm, circuit, or device.

Although FIG. 5 illustrates one example of a method 500 for monitoring assets at a tag 112 in a security system, various changes may be made to FIG. 5. For example, the tag 112 could take no action when it detects the absence of the polling signal.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An asset subsystem for use in a security system, the security system including a security system controller operable to trigger a first alarm, the asset subsystem comprising:
   a transceiver operable to communicate a first signal to a tag associated with an asset and to receive a second signal communicated by the tag in response to the first signal; and
   a controller operable to:
      determine whether the tag failed to communicate the second signal to the transceiver; and
      trigger the first alarm in response to determining that the tag failed to communicate the second signal to the transceiver;
   wherein the tag is operable to trigger a second alarm when the tag fails to receive the first signal from the transceiver.

2. The asset subsystem of claim 1, wherein the controller is operable to trigger the first alarm by communicating with the security system controller.

3. The asset subsystem of claim 2, wherein the controller is operable to communicate with the security system controller through an interface unit.

4. The asset subsystem of claim 1, wherein:
   the tag is operable to receive input from a sensor; and
   the controller is further operable to trigger the first alarm based on the input received by the tag.

5. The asset subsystem of claim 4, wherein:
   the sensor comprises a motion sensor; and
   the controller is operable to trigger the first alarm when the motion sensor detects movement and the asset is not allowed to be moved.

6. The asset subsystem of claim 4, wherein the controller is operable to trigger the first alarm based on the input received by the tag even when the tag successfully communicates the second signal to the transceiver.

7. The asset subsystem of claim 1, wherein:
   the transceiver comprises a radio frequency transceiver; and
   the first signal comprises one of a plurality of polling signals.

8. The asset subsystem of claim 7, wherein the controller is operable to trigger the first alarm when the tag fails to communicate the second signal in response to more than one of the polling signals.

9. The asset subsystem of claim 1, wherein the transceiver and controller comprise at least a portion of a portable unit.

10. The asset subsystem of claim 9, wherein the portable unit is adapted to be placed in a cradle, the cradle operable to recharge an internal power supply in the portable unit and to provide an interface between the portable unit and the security system controller.

11. The asset subsystem of claim 1, wherein the tag comprises one of a plurality of tags, each tag operable to receive the first signal from the transceiver and to communicate a unique second signal in response to the first signal.

12. A security system, comprising:
an alarm;
a security system controller operable to trigger the alarm; and
an asset subsystem operable to monitor one or more assets, the asset subsystem comprising:
a control unit operable to communicate with the security system controller; and
an intermediate unit operable to communicate with the control unit, to communicate a first signal to a tag associated with the one or more assets, and to receive a second signal communicated by the tag in response to the first signal;
wherein at least one of the control unit and the intermediate unit is operable to determine whether the tag failed to communicate the second signal, the control unit operable to trigger the alarm in response to a determination that the tag failed to communicate the second signal; and
wherein the tag is operable to trigger an external circuit when the tag fails to receive the first signal.

13. The security system of claim 12, wherein the control unit is operable to trigger the alarm by communicating with the security system controller.

14. The security system of claim 13, further comprising an interface unit operable to facilitate communication between the control unit and the security system controller.

15. The security system of claim 12, wherein:
the tag is attached to a vehicle; and
the external circuit comprises a vehicle security system.

16. The security system of claim 15, wherein the vehicle security system comprises a circuit operable to disable the vehicle.

17. The security system of claim 12, wherein:
the tag is operable to receive input from a sensor; and
the asset subsystem is further operable to trigger the alarm based on the input received by the tag.

18. The security system of claim 17, wherein:
the sensor comprises a motion sensor; and
the asset subsystem is operable to trigger the alarm when the motion sensor detects movement and the asset is not allowed to be moved.

19. The security system of claim 17, wherein the asset subsystem is operable to trigger the alarm based on the input received by the tag even when the tag successfully communicates the second signal.

20. A method, comprising:
communicating a first signal to a tag associated with an asset;
determining whether a second signal is received from the tag during a specified period of time; and
triggering a first alarm in response to determining that the tag failed to communicate the second signal during the specified time period, wherein triggering the first alarm comprises communicating with a security system controller operable to trigger the first alarm, the security system controller and the first alarm comprising a portion of a security system;
wherein the tag is operable to trigger a second alarm when the tag fails to receive the first signal.

21. The method of claim 20, wherein communicating with the security system controller comprises communicating with the security system controller through an interface unit.

22. The method of claim 20, wherein the tag is operable to receive input from a sensor; and
further comprising triggering the first alarm based on the input received by the tag.

23. The method of claim 22, wherein:
the sensor comprises a motion sensor; and
triggering the first alarm based on the input comprises triggering the first alarm when the motion sensor detects movement and the asset is not allowed to be moved.

24. The method of claim 22, wherein triggering the first alarm based on the input comprises triggering the first alarm based on the input even when the tag successfully communicates the second signal to the transceiver.

25. A tag, comprising:
a transceiver operable to receive a first signal and to communicate a second signal; and
a controller operable to:
detect the first signal received by the transceiver;
initiate communication of the second signal by the transceiver; and
trigger an external circuit in response to determining that the first signal was not received within a specified period of time.

26. The tag of claim 25, wherein:
the tag is attached to a vehicle; and
the external circuit comprises a vehicle security system.

27. The tag of claim 26, wherein the vehicle security system comprises a circuit operable to disable the vehicle.

28. The tag of claim 25, wherein:
the controller is further operable to receive input from a sensor; and
at least a portion of contents of the second signal is based on the input from the sensor.

29. The tag of claim 28, wherein:
the sensor comprises a motion sensor; and
the second signal indicates whether the motion sensor has detected movement.

30. The tag of claim 25, wherein the first signal is transmitted by at least one of a control unit and an intermediate unit in an asset subsystem of a security system.

31. The security system of claim 12, wherein the external circuit comprises a second alarm.

32. The tag of claim 25, wherein the external circuit comprises an alarm.

33. The tag of claim 32, wherein the alarm comprises at least one of: an audible alarm and a visual alarm.

* * * * *

UNITED STATES PATENT AND TRADEMARK OFFICE
CERTIFICATE OF CORRECTION

| | |
|---|---|
| PATENT NO. | : 7,046,147 B2 |
| APPLICATION NO. | : 10/651386 |
| DATED | : May 16, 2006 |
| INVENTOR(S) | : Robert E. Stigall |

Page 1 of 1

It is certified that error appears in the above-identified patent and that said Letters Patent is hereby corrected as shown below:

Column 5, line 1, delete "the" (first occurrence) and replace with -- to --;

Column 7, line 53, delete "than" and replace with -- that --;

Column 9, line 55, delete "generate" and replace with -- generates --.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO.         : 7,046,147 B2
APPLICATION NO. : 10/651386
DATED                 : May 16, 2006
INVENTOR(S)       : Robert E. Stigall Page 1 of 1

It is certified that error appears in the above-identified patent and that said Letters Patent is hereby corrected as shown below:

Column 6, line 45, delete "210" and replace with --206--;
Column 6, line 49, delete "210" and replace with --206--;
Column 6, line 56, delete "210" and replace with --206--;
Column 6, line 57, delete "210" and replace with --206--;
Column 6, line 58, delete "210" and replace with --206--;
Column 6, line 60, delete "210" and replace with --206--;
Column 6, line 62, delete "210" and replace with --206--;
Column 6, line 64, delete "210" and replace with --206--;
Column 6, line 66, delete "212" and replace with --208--;
Column 6, line 66, delete "210" and replace with --206--;
Column 6, line 67, delete "212" and replace with --208--;
Column 7, line 1, delete "210" and replace with --206--;
Column 7, line 1, delete "212" and replace with --208--;
Column 7, line 2, delete "210" and replace with --206--;
Column 7, line 5, delete "212" and replace with --208-- (both occurrences);
Column 7, line 7, delete "212" and replace with --208--;
Column 7, line 10, delete "210" and replace with --206--;
Column 7, line 11, delete "210" and replace with --206--;
Column 7, line 15, delete "210" and replace with --206--;
Column 7, line 19, delete "214" and replace with --210-- (both occurrences);
Column 7, line 19, delete "210" and replace with --206--; and
Column 7, line 22, delete "214" and replace with --210--.

Signed and Sealed this

Twenty-second Day of December, 2009

David J. Kappos
*Director of the United States Patent and Trademark Office*